United States Patent
Bushell et al.

(10) Patent No.: US 10,852,156 B2
(45) Date of Patent: Dec. 1, 2020

(54) APPARATUS FOR AN AIRCRAFT COCKPIT DISPLAY

(75) Inventors: Mark Anthony Bushell, Cheltenham (GB); Brett Allen Eddy, Phoenix, AZ (US)

(73) Assignee: GE AVIATION SYSTEMS LIMITED (GB)

( * ) Notice: Subject to any disclaimer, the term of this patent is extended or adjusted under 35 U.S.C. 154(b) by 27 days.

(21) Appl. No.: 13/487,604

(22) Filed: Jun. 4, 2012

(65) Prior Publication Data
US 2013/0250186 A1 Sep. 26, 2013

(30) Foreign Application Priority Data
Mar. 20, 2012 (GB) .................................. 12048401

(51) Int. Cl.
*G09G 3/34* (2006.01)
*G01C 23/00* (2006.01)
*G09G 3/36* (2006.01)

(52) U.S. Cl.
CPC ........... *G01C 23/005* (2013.01); *G09G 3/342* (2013.01); *G09G 3/3659* (2013.01); *G09G 3/3666* (2013.01); *G09G 2330/08* (2013.01); *G09G 2380/12* (2013.01)

(58) Field of Classification Search
CPC ...... G06F 3/0325; G06F 3/033; G06F 3/0346; G06F 3/03545; G06F 2203/0334; G06F 2203/0383; G06F 2203/04802
See application file for complete search history.

(56) References Cited

U.S. PATENT DOCUMENTS

| | | | |
|---|---|---|---|
| 4,859,997 A | 8/1989 | Bouron et al. | |
| 5,631,754 A | 5/1997 | Jannson et al. | |
| 5,668,569 A | 9/1997 | Greene et al. | |
| 6,285,360 B1* | 9/2001 | Li | 345/204 |
| 6,977,666 B1 | 12/2005 | Hedrick | |
| 7,724,259 B2 | 5/2010 | Hedrick et al. | |
| 7,855,664 B2 | 12/2010 | Morizet et al. | |
| 8,098,175 B2 | 1/2012 | Berthou et al. | |
| 2002/0075248 A1 | 6/2002 | Morita et al. | |
| 2005/0284984 A1* | 12/2005 | De Lauzun et al. | 244/129.1 |
| 2007/0046680 A1* | 3/2007 | Hedrick et al. | 345/503 |
| 2007/0139355 A1 | 6/2007 | Ryuh et al. | |

(Continued)

FOREIGN PATENT DOCUMENTS

| | | |
|---|---|---|
| CN | 101006404 A | 7/2007 |
| EP | 1783699 A2 | 5/2007 |

(Continued)

OTHER PUBLICATIONS

Search Report from corresponding GB Application No. 1204840.1, dated Jun. 28, 2012.

(Continued)

*Primary Examiner* — William Boddie
*Assistant Examiner* — Jeffrey Parker
(74) *Attorney, Agent, or Firm* — Wood IP LLC

(57) ABSTRACT

An aircraft cockpit display includes among other things an LCD panel having a liquid crystal matrix, and backlight assembly for illuminating the liquid crystal matrix. The remainder of the display allows for single point failures within the architecture that impact only a portion of the primary display functions of the LCD panel.

12 Claims, 3 Drawing Sheets

(56) References Cited

U.S. PATENT DOCUMENTS

| | | |
|---|---|---|
| 2008/0208399 A1 | 8/2008 | Pham |
| 2008/0284694 A1 | 11/2008 | Dunn |
| 2009/0073104 A1 | 3/2009 | Lu et al. |
| 2010/0090868 A1 | 4/2010 | Hall |
| 2010/0289963 A1* | 11/2010 | LeFort et al. ............... 348/659 |
| 2011/0148825 A1* | 6/2011 | Ueno ................. G09G 3/006 345/204 |
| 2012/0062612 A1* | 3/2012 | Tanada et al. ............... 345/690 |
| 2012/0147293 A1* | 6/2012 | Dunn ............ G02F 1/133603 349/65 |
| 2012/0256768 A1 | 10/2012 | Kratchounova et al. |
| 2012/0280986 A1 | 11/2012 | Chabot et al. |
| 2013/0120664 A1 | 5/2013 | Bushell et al. |
| 2013/0250186 A1 | 9/2013 | Bushell et al. |
| 2013/0276037 A1 | 10/2013 | Bushell et al. |

FOREIGN PATENT DOCUMENTS

| | | |
|---|---|---|
| EP | 1783699 A2 | 9/2007 |
| FR | 2843646 A1 | 2/2004 |
| FR | 2974938 A1 | 11/2012 |
| GB | 2447967 A | 10/2008 |
| JP | H06-223288 A | 8/1994 |
| JP | H07-325980 A | 12/1995 |
| JP | 2000315068 A | 11/2000 |
| JP | 2002091372 A | 3/2002 |
| JP | 2003044013 A | 2/2003 |
| JP | 2005-202306 A | 7/2005 |
| JP | 2007212956 A | 8/2007 |
| WO | 9853366 A1 | 11/1998 |
| WO | 2005078697 A1 | 8/2005 |
| WO | 2008009955 A1 | 1/2008 |

OTHER PUBLICATIONS

Search Report and Written Opinion from GB Application No. 1219666.3 dated Feb. 20, 2013.

Search Report and Written Opinion from FR Application No. 1260007 dated Aug. 23, 2013.

Search Report for corresponding GB Application No. 1119482.6, dated Feb. 13, 2012.

David Allen: "Electronic Flight Bag (EFB)" Internet Citation Oct. 10, 2006 (Oct. 10, 2006), pp. 1-17, XP002496643 Internet Extract URL: http://web.archive.org/web/20061010202846/http://www.boeing.com/commercial/aeromagazine/aero_23/EFB_story.html (extracted on Sep. 22, 2008) the whole document.

Search Report from corresponding GB Application No. 1206654.4, dated Aug. 14, 2012.

Search Report for corresponding FR1352189, dated Feb. 6, 2014.

Unofficial translation of CN office action dated Nov. 2, 2015 in relation to corresponding CN Application 201310089568.0.

Office Action issued in connection with corresponding JP Application No. 2013-054485 dated Feb. 28, 2017.

Decision of Refusal issued in connection with corresponding JP Application No. 2013-054485 dated Jul. 4, 2017.

* cited by examiner

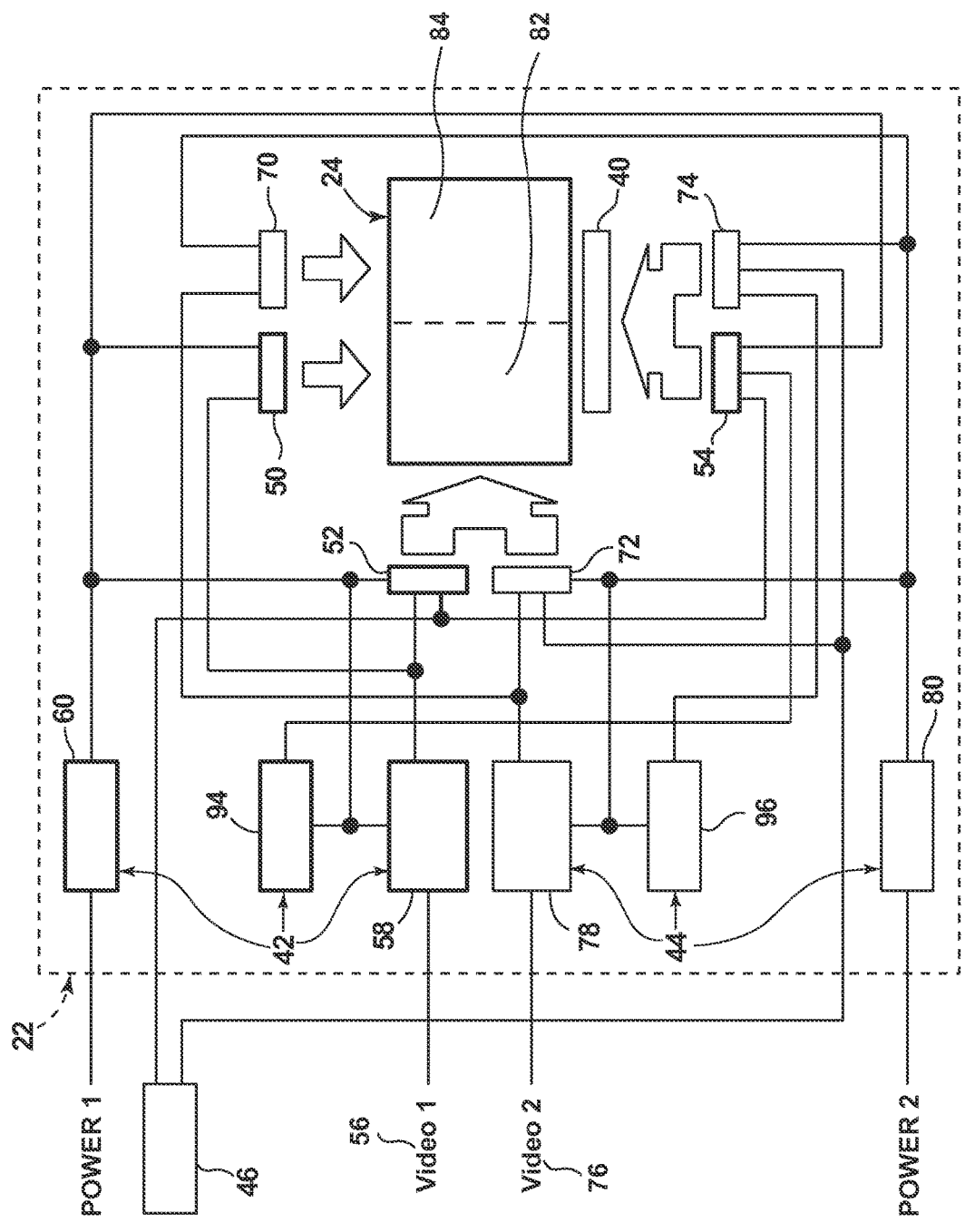

APPARATUS FOR AN AIRCRAFT COCKPIT DISPLAY

CROSS-REFERENCE TO RELATED APPLICATIONS

This application claims priority under 35 U.S.C. § 119 to British Patent Application No. 12048401, filed Mar. 20, 2012, the disclosure of which is incorporated herein by reference.

BACKGROUND OF THE INVENTION

Contemporary aircraft cockpits include a flight deck having multiple flight displays, which display to the flight crew a wide range of aircraft, flight, navigation, and other information used in the operation and control of the aircraft. Within the aviation industry there is a trend towards using large widescreen format displays within the cockpit. This brings the advantage of providing a larger configurable display surface to provide more information to the flight crew and offers the ability to tailor display formats and information displayed. Because all primary flight information may be displayed on the single display surface instead of a plurality of displays or instruments the loss of the single display surface will be far more severe than with the traditional approach.

BRIEF DESCRIPTION OF THE INVENTION

In one embodiment, an aircraft cockpit display includes a display panel having a liquid crystal matrix with pixels arranged in rows and columns, a backlight for illuminating the liquid crystal matrix, first and second independent video channels, with each video channel having a row driver operably coupled to and driving the rows in the liquid crystal matrix, the first video channel having a first column driver operably coupled to and driving the columns of a first portion of the liquid crystal matrix, the second video channel having a second column driver operably coupled to and driving the columns of a second portion of the liquid crystal matrix, with the first portion not identical to the second portion, and a switch for selecting between the first and second independent video channels to display a video signal on the display panel.

In another embodiment, an aircraft cockpit display includes an LCD panel having a liquid crystal matrix with pixels arranged in rows and columns, a backlight having an array of LEDs for illuminating the liquid crystal matrix, first and second independent video channels, with each video channel having a row driver operably coupled to and driving the rows in the liquid crystal matrix, the first video channel having a column driver operably coupled to and driving the columns of a first portion of the liquid crystal matrix, the second video channel having a column driver operably coupled to and driving the columns of a second portion of the liquid crystal matrix, with the second portion not identical to the first portion, first and second independent backlight control channels with each channel having an LED driver operably coupled to the array of LEDs to control the backlight to the liquid crystal matrix, and a switch for selecting between the first and second independent video channels to display a video signal on the LCD panel.

BRIEF DESCRIPTION OF THE DRAWINGS

In the drawings:

FIG. 3 is a schematic view of one of the flight display modules of the aircraft cockpit of FIG. 2 according to an embodiment of the invention.

DESCRIPTION OF EMBODIMENTS OF THE INVENTION

Figure 1:
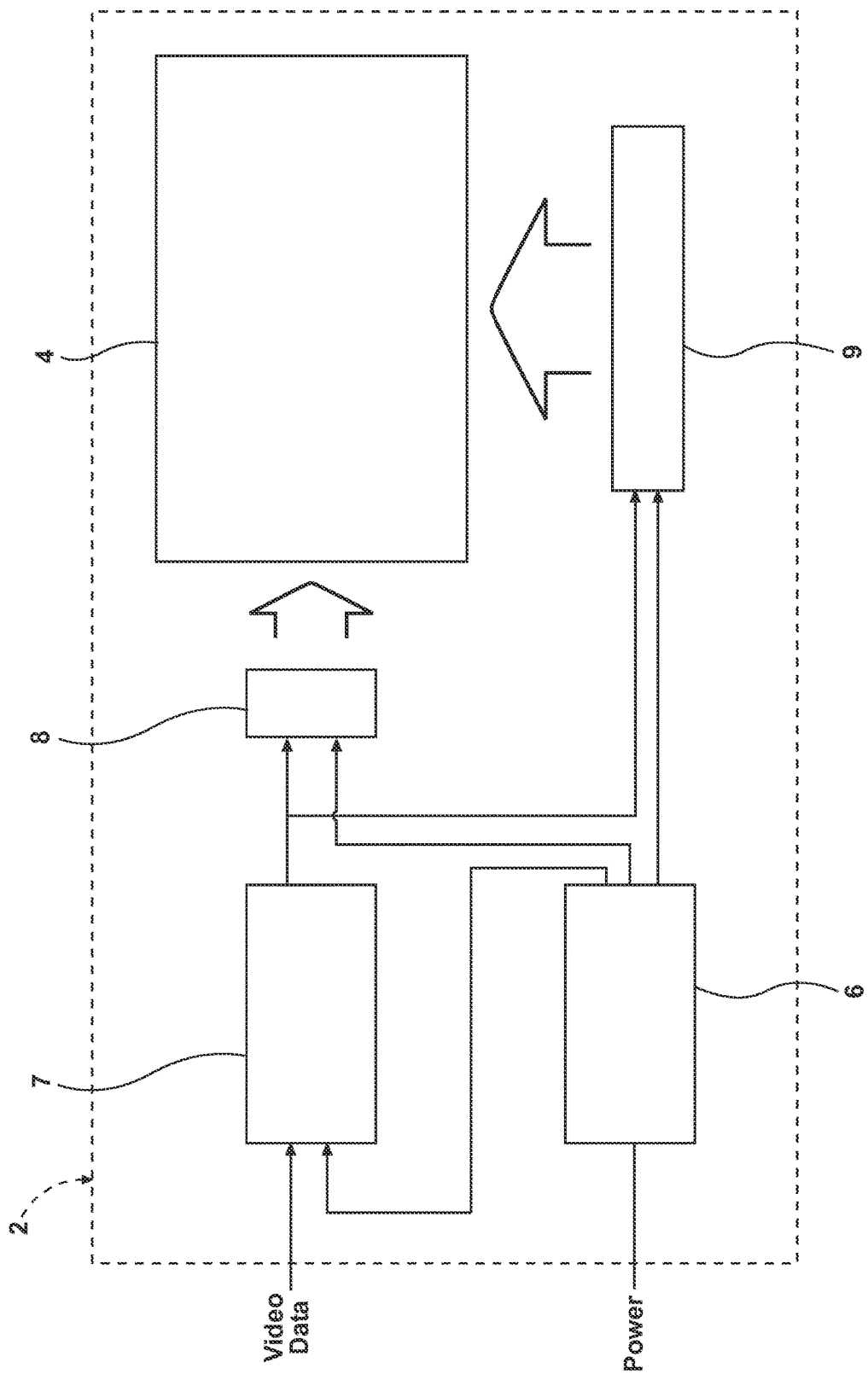
FIG. 1 is a schematic view of a prior design flight display module.

FIG. 1 illustrates a prior design flight display module 2. The flight display module 2 includes a display panel 4, which may be a widescreen LCD display panel, and associated power and control electronics including power circuitry 6, timing controls 7, display drivers in the form of row and column display drivers 8 and 9. Power and video data are fed into the flight display module 2 and any failure within the prior design flight display module 2 whether with the power circuitry 6, timing controls 7, or display drivers 8 and 9 would adversely affect the ability of the flight display module 2 to display uncorrupted video data on the display panel 4. The corruption could manifest itself as either partial or full screen video corruption on the LCD panel. When the display is a widescreen display, the effect of the loss of such a large area display is significantly more acute than the loss of a single mechanical instrument or loss of smaller electronic flight instrument displays on conventionally equipped aircrafts.

Figure 2:
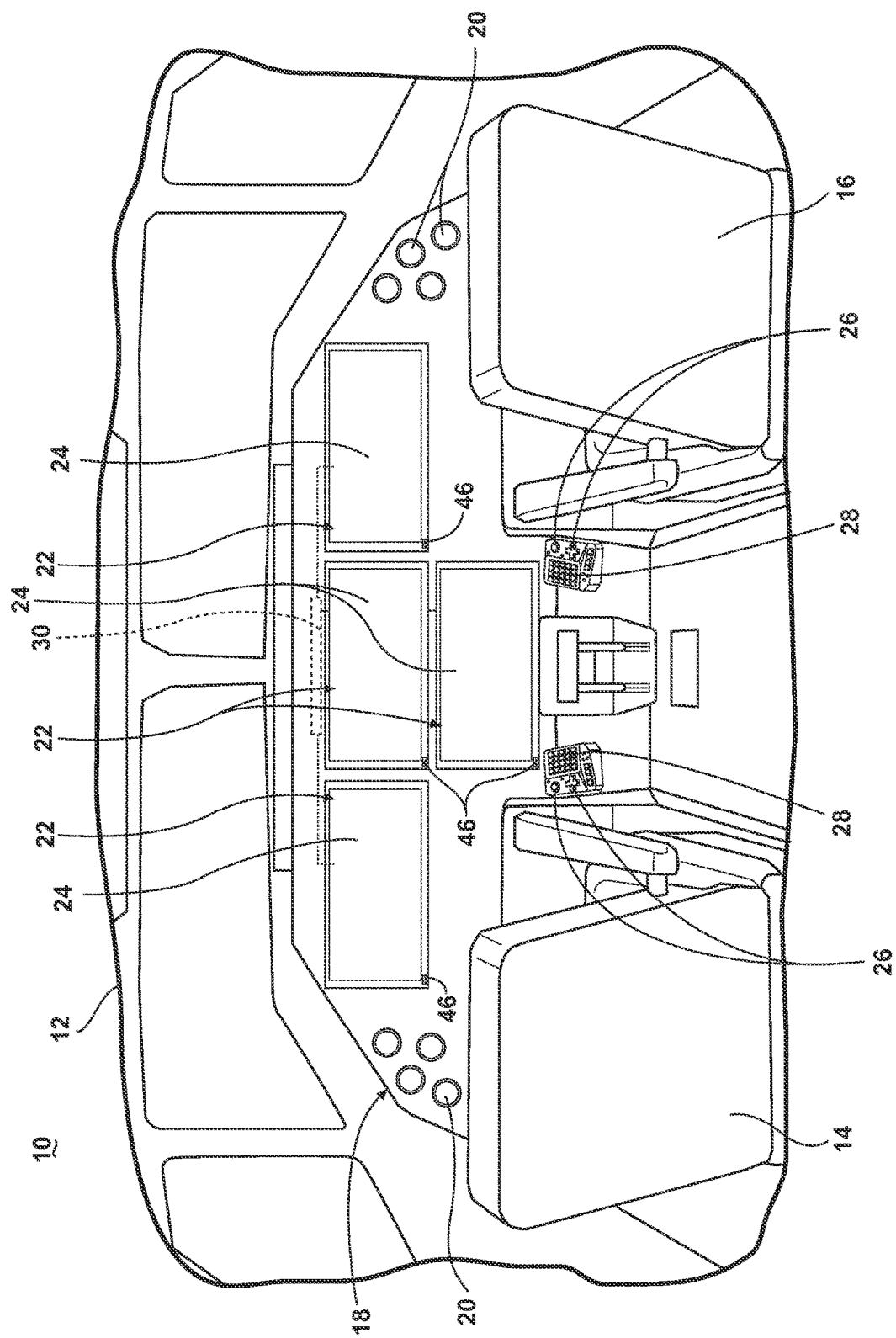
FIG. 2 is a perspective view of a portion of an aircraft cockpit having multiple flight display modules according to an embodiment of the invention.

The below described inventive embodiments ensure that the flight display module has high availability and that any single failure, excluding that of the LCD panel itself, has a reduced impact on the primary display functions. FIG. 2 illustrates a portion of an aircraft 10 having a cockpit 12 according to one embodiment of the invention. While a commercial aircraft has been illustrated, it is contemplated that embodiments of the invention may be used in any type of aircraft, for example, without limitation, fixed-wing, rotating-wing, rocket, personal aircraft, and military aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple flight display modules 22 may be located in front of the pilot and co-pilot and may provide the flight crew with information to aid in flying the aircraft 10. The flight display modules 22 may include either primary flight displays or multi-function displays and may display a wide range of aircraft, flight, navigation, systems, and other information used in the operation and control of the aircraft 10. The flight display modules 22 have been illustrated as being in a spaced, side-by-side arrangement with each other. The flight display modules 22 may be laid out in any manner including having fewer or more displays. Further, the flight display modules 22 need not be coplanar and need not be the same size. A display panel 24 on which the display representation may be provided may be included in the flight display modules 22. This display panel may include any display panel having a matrix of individually controllable pixels, such as LCD and LED. By way of non-limiting example the display panel 24 may be a flat Active Matrix Liquid Crystal Display (AMLCD) panel.

It is contemplated that one or more cursor control devices 26 and one or more multifunction keyboards 28 may be included in the cockpit 12 and may also be used by one or more flight crew members to interact with the systems of the aircraft 10. A suitable cursor control device 26 may include any device suitable to accept input from a user and to convert that input to a graphical position on any of the multiple flight display modules 22. Various joysticks, multi-way rocker switches, mice, trackballs, and the like are suitable for this purpose and each user may have separate cursor control device(s) 26 and keyboard(s) 28.

A controller 30 may be operably coupled to components of the aircraft 10 including the flight display modules 22, cursor control devices 26, and keyboards 28. The controller 30 may also be connected with other controllers (not shown) of the aircraft 10. The controller 30 may include memory and processing units, which may be running any suitable programs to operate the aircraft 10. The controller 30 may also receive inputs from one or more other additional sensors (not shown), which may provide the controller 30 with various information to aid in the operation of the aircraft 10.

FIG. 3 illustrates a schematic embodiment of the flight display module 22. The display panel 24, a back light assembly 40, a first channel 42 consisting of a power source 60, timing controller 58, backlight controller 94, column driver 50, row driver 52, and LED backlight driver 54, and a second channel 44 consisting of a power source 80, timing controller 78, backlight controller 96, column driver 70, row driver 72, and LED backlight driver 74 are illustrated as being included in the flight display module 22. A switch 46 is illustrated as being operably coupled to the flight display module 22.

The display panel 24 may include a liquid crystal matrix (not shown) with an array of pixels where each pixel consists of a color group of multiple subpixels and each subpixel is addressable by rows and columns and programmed by their associated row and column drivers. Such a display panel 24 may include a horizontal dimension of 13.2 inches (335 mm), a vertical dimension of 7.9 inches (201 mm), that is, an aspect ratio of 16:9 and a diagonal dimension of 15.3 inches (389 mm). It will be appreciated that different size screens could be used and that the aspect ratio could be changed from the wide screen format mentioned above.

The backlight assembly 40 may be any suitable backlight assembly including a light emitting diode (LED) backlight assembly 40 having an array of LEDs (not shown). The backlight assembly 40 may be mounted behind the display panel 24. It is contemplated that the backlight assembly 40 may be of an LED variety because LED arrays reproduce color better and consume less electricity then cathode fluorescent lamps. The array of LEDs in the LED backlight assembly 40 may be mounted on a printed circuit board (not shown) to give sufficient light to illuminate the liquid crystal matrix of the display panel 24.

First channel 42 and second channel 44 are two identical and independent video channels capable of displaying a video signal on the LCD panel. The first channel 42 is illustrated as including column drivers 50, row drivers 52, backlight drivers 54, a timing controller 58, backlight controller 94, and a power source 60. The second channel 44 is illustrated as including column drivers 70, row drivers 72, backlight drivers 74, a timing controller 78, backlight controller 96, and a power source 80.

The column drivers 50 of the first channel 42 may be operably coupled to the columns in a first portion 82 of the liquid crystal matrix of the display panel 24. The column drivers 70 of the second channel 44 may be operably coupled to the columns in a second portion 84 of the liquid crystal matrix of the display panel 24. The first and second portions 82 and 84 of the liquid crystal matrix of the display panel 24 are not identical. For illustrative purposes only, the first portion 82 has been illustrated as the left half of the liquid crystal matrix of the display panel 24 while the second portion 84 has been illustrated as the right half of the liquid crystal matrix of the display panel 24. It will be understood that the first portion and the second portion 82 and 84 need not be one half of the liquid crystal matrix of the display panel 24.

The row drivers 52 and 72 of the first and second channels 42 and 44, respectively, may be operably coupled to all of the rows in the liquid crystal matrix of the display panel 24. In this manner, each of the row drivers 52 and 72 are capable of selectively driving all the rows in the liquid crystal matrix of the display panel 24. In the case where the backlight assembly is of the LED variety the backlight drivers 54 and 74 may be LED drivers and may be operably coupled to the array of LEDs of the backlight assembly 40 to control the backlight assembly 40 to illuminate the liquid crystal matrix of the display panel 24. Each of the backlight drivers 54 and 74 may be capable of selectively driving the array of LEDs of such a backlight assembly 40.

The timing controller 58 of the first channel 42 is operably coupled to the column drivers 50 and row drivers 52. The timing controller 58 is capable of outputting control signals to the column driver 50 and row driver 52. The timing controller 78 of the second channel 44 is operably coupled to the column drivers 70 and row drivers 72. The timing controller 78 is capable of outputting control signals to the column drivers 70 and row drivers 72.

The backlight controller 94 of the first channel 42 is operably coupled to the backlight driver 54. The backlight controller 94 is capable of outputting control signals to the backlight driver 54. The backlight controller 96 of the second channel 44 is operably coupled to the backlight driver 74. The backlight controller 96 is capable of outputting control signals to the backlight driver 74. It is contemplated that the timing controller and backlight controller of each of the first and second independent video channels 42 and 44 may be implemented separately or may be implemented within a single device.

A first power input or power source 60 is included in the first channel 42 and supplies power to the components of the first channel 42. A second power input or power source 80 is included in the second channel 44 and supplies power to the components of the second channel 44.

The switch 46 provides for selecting between the first and second independent video channels 42 and 44 to display a video signal from the selected first and second independent video channels 42 and 44 on the display panel 24. The switch 46 may be a manual switch that is located within reach of a pilot and/or co-pilot within the cockpit 12. The switch 46 may be integrated with the flight display module 22. For example, the switch has been illustrated as being externally mounted to the flight display module 22.

It is contemplated that the switch 46 may be a two position manual switch that selects either the first channel 42 or the second channel 44 to be the active channel. It is contemplated that the manual switch 46 could also include an auto switch position. When the auto switch position is selected, an arbiter module (not shown) within the flight display module 22 may default to a predefined channel when the flight display module 22 is powered up and may monitor the health of each function within each of the first and second independent video channels 42 and 44 that affects the integrity of the video data stream. In the event a fault is detected, the alternative channel would be automatically switched over to the active channel.

While the switch 46 has been illustrated and described as a manual switch, it is contemplated that the switch 46 may be entirely automatic. Such an automatic switch may be included within the flight display module 22. The automatic switch may be capable of switching between the first and second independent video channels 42 and 44 in response to a failure in one of the first and second independent video channels 42 and 44 and may act similarly to the auto switch position described above. Such an automatic switch mechanism or arbiter module may be duplicated within the flight display module 22.

During operation, the first channel 42 may provide display graphics on the first portion 82 of the display panel 24 and the second channel 44 may provide display graphics on the second portion 84 of the display panel 24. The first channel 42 and second channel 44 may be synchronized and only the channel selected as active by the switch 46 will control the corresponding row drivers 52 and 72 of the display panel 24 and the corresponding backlight driver 54 and 74. The first channel 42 and the second channel 44 provide the first portion 82 and the second portion 84, respectively, display graphics for the display panel 24. An active channel may be initially selected automatically or manually upon powering up of the flight display module 22. It is contemplated that the column driver 50 of the first channel 42 and the column driver 70 of the second channel 44 may each include a multiplexer to allow control of both column driver 50 and column driver 70 from either timing controller 58 or timing controller 78 as selected by switch 46, and the first channel 42 and second channel 44 may not be required to be synchronized.

A failure within the active channel may result in failure of the display panel 24, with a portion of the display functionality being restored following selection of the other channel. The selection of the other channel makes that channel the active channel and allows the appropriate row drivers, column drivers, and backlight drivers to be operated to provide a video display on the corresponding portion of the display panel 24. Switching between the first channel 42 and the second channel 44 may be carried out manually, such as by the pilot or co-pilot changing the setting of the switch 46. Alternatively, the switching could be carried out by an automatic switch in response to fault detection processing built into the flight display module 22. By way of non-limiting example, there may be a display monitor that performs error detection processing to determine whether any of the graphical information, i.e., textual information, graphic symbols and charts, is erroneous.

When one channel is selected as active, the row drivers of the inactive channel may be disabled. By way of non-limiting example, the source of power may be interrupted to the row drivers of the deselected channel. Alternatively or in addition to the source of power being interrupted, the row drivers of the deselected or inactive channel may be set to an open or tri-state condition to prevent corruption of the active channel.

While the embodiments above have been illustrated and described with respect to a cockpit 12 having a flight display module 22 and a first video channel 42 having a first column driver 50 operably coupled to and driving the columns of one portion 82 of the liquid crystal matrix and a the second video channel 44 having a second column driver 70 operably coupled to and driving the columns of another portion of the liquid crystal matrix it will be understood that alternative embodiments have been contemplated. For example, the first channel may have a row driver operably coupled to and driving the rows in the liquid crystal matrix and have a column driver operably coupled to and driving the columns of a first portion and a second portion. Similarly, the second channel may have a row driver operably coupled to and driving the rows in the liquid crystal matrix and have a column driver operably coupled to and driving the columns of a third portion and a fourth portion. The first, second, third, and fourth portions may not be identical to any of the other portions and the portions controlled by the first channel may be interleaved with the portions controlled by the second channel. Such an embodiment may operate similarly to the embodiment described above except for multiple portions of the display screen may be operated at any one time by a single channel.

As yet another example, the embodiment described above may include additional video channels capable of operating corresponding additional portions of the flight display. By way of non-limiting example, a third independent video channel may be included, with the third video channel having a row driver operably coupled to and driving the rows in the liquid crystal matrix and having a third column driver operably coupled to and driving the columns of a third portion of the liquid crystal matrix, with the third portion not identical to the either of the first portion 82 or the second portion 84 and where the switch 46 is configured to select between the first, second, and third independent video channels to display a video signal on the LCD panel.

Further, it will be understood that rows and columns are interchangeable as they are relative references depending on a user's orientation to the display. Thus, as the cockpit may include alternative flight display modules, the first and second video channels may be included such that the first video channel may have a first row driver operably coupled to and driving the rows of one portion of the liquid crystal matrix and the second video channel may have a second row driver operably coupled to and driving the rows of another portion of the liquid crystal matrix, with the second portion not identical to the first portion. In this manner a portion of the display panel may still be used. This may be of added benefit where the flight display is vertically oriented.

The above described embodiments allow for multiple benefits. For example, the above described embodiments ensure that the flight display module has high availability and that any single failure, excluding the LCD panel itself, may impact no more than a portion of the primary display functions of the flight display module. While some prior art displays are capable of having redundancy in some portions of the display using a custom LCD panel, current aircraft displays do not maximize availability as described above. Due to the high availability design of the above described embodiments, portions of the screen operation will still be possible with one graphics channel failed and integrity of the display video data is ensured in the event of a failure within the active channel. Such enhanced system availability is vital given that a failure of such a flight display would result in the total loss of primary flying instruments on one side of the cockpit. The above described embodiments restrict the number of single point failures that may cause loss of the entire display on the flight display module. The only remaining single channel device in the flight display module is the LCD itself, but the vast majority of failures result in loss of a single pixel or a single row or column of pixels, which has minimal impact on readability of the display, rather than the total loss of the LCD. Individual LEDs of the backlight assembly may also fail, but will have minimal impact on backlight uniformity and readability of the display. The high availability of the flight display module also allows for a reduction or elimination in maintenance delays due to electronic flight instrument system related problems associated with the display.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft cockpit display comprising:
   a display panel disposed within a flight display module, the display panel including only one pixel matrix with pixels arranged in rows and columns and configured for receiving illumination from a backlight;
   first and second independent video channels, each including a (i) row driver selectively connectable to all of the rows, (ii) column driver operably coupled to and driving the columns of a corresponding portion of the display panel, and (iii) backlight driver for selectively controlling the backlight to provide the illumination;
   wherein only one of the row drivers is activated at an instant in time; and
   a switch for selecting one of the first and second independent video channels upon occurrence of a failure in the other of the first and second independent video channels, the selected independent video channel being capable of facilitating control of its corresponding row driver and the row driver of the other of the first and second independent video channels;
   wherein, the switch selects one of the first and second independent video channels in response to a fault detection system within the flight display module, the fault detection system being configured to detect errors in graphical information related to the display panel; and
   wherein the selected independent video channel operates (i) the selected row driver, (ii) corresponding one of—the column drivers, and (iii) a corresponding one of the backlight drivers, as the row drivers of the other of the first and second independent video channels are disabled, to display a video signal on the portion of the display panel corresponding to the selected independent video channel.

2. The aircraft cockpit display of claim 1, wherein the switch is an automatic switch.

3. The aircraft cockpit display of claim 2, wherein the automatic switch switches between the first and second independent video channels in response to a failure in one of the first and second independent video channels.

4. The aircraft cockpit display of claim 1, wherein each of the first and second independent video channels further comprise independent sources of power.

5. The aircraft cockpit display of claim 4, wherein when a channel is deselected the source of power may be interrupted to that channel.

6. The aircraft cockpit display of claim 1, wherein the first portion is one half of the display panel and the second portion is the other half of the display panel.

7. The aircraft cockpit display of claim 6, wherein the halves are the left and right halves of the display panel.

8. The aircraft cockpit display of claim 1, wherein each of the first and second independent video channels further comprises a timing controller.

9. The aircraft cockpit display of claim 1, wherein the first and second portions do not overlap.

10. The aircraft cockpit display of claim 1, wherein when the channel is deselected the row driver may be set to a tri-stated condition.

11. The aircraft cockpit display of claim 1, wherein at least one of the row driver, the column driver, and the backlight driver is associated with only one of the first and second portions the display panel and another one of the row driver, the column driver, and the backlight driver is associated with the first portion and second portion.

12. An aircraft cockpit display comprising:
    an LCD panel disposed within a flight display module, the LCD panel having a liquid crystal matrix with pixels arranged in rows and columns and configured for receiving illumination from a backlight;
    first and second independent video channels, each including a (i) row driver selectively connectable to all of the rows, (ii) column driver operably coupled to and driving the columns of a corresponding portion of the matrix, and (iii) backlight driver for selectively controlling the backlight to provide the illumination;
    wherein only one of the row drivers is activated at an instant in time; and
    a switch for selecting one of the first and second independent video channels upon occurrence of a failure in the other of the first and second independent video channels, the selected independent video channel being capable of facilitating control of its corresponding row driver and the row driver of the other of the first and second independent video channels;
    wherein, the switch selects one of the first and second independent video channels in response to a fault detection system within the flight display module, the fault detection system being configured to detect errors in graphical information related to the display panel;
    wherein, a source of power is interrupted to the other of the first and second independent video channels; and
    wherein the selected first or second independent video channel operates (ii) the selected row driver (ii) a corresponding one of the column drivers, and a corresponding one of the backlight drivers corresponding to selected independent video channel to display a video signal on the corresponding portion of the LCD panel, as the row drivers of the other of the first and second independent video channels are disabled.

* * * * *